Patented Oct. 11, 1932

1,881,989

UNITED STATES PATENT OFFICE

VAN LEAR WOODWARD, OF STONE RIDGE, NEW YORK

CHEWING GUM

No Drawing.   Application filed February 17, 1930.   Serial No. 429,215.

This invention relates to chewing gum and particularly to the use of Euphorbia coagulum as an ingredient in the base composition of chewing gum, which can be manufactured at low cost.

Commercial chewing gums usually contain chicle mixed with pontianak (sometimes called gutta jelutong) and other gums, whose principal purpose is to reduce the cost of the product, as chicle is very expensive compared with other gums. Chicle and pontianak are both hard to obtain, as the trees producing them grow in difficultly accessible areas of dense vegetation, and instead of being tapped are often cut down and destroyed. Today the cheaper chewing gums, such as unbranded slot machine gums, contain very little, if any, chicle, while the substitutes heretofore available to replace part of the chicle in higher grade gums have been at times lacking in uniformity, elasticity, resistance to oxidation, permanence of characteristics under chewing, and other properties which are desirable in a chewing gum of good quality.

I have discovered in the coagulated latex obtained by tapping or extraction from certain trees or bushes, designated as the Euphorbia, an excellent chewing gum material. This coagulum is admirably suited for a base or principal ingredient of an economical high grade chewing gum, and is in several respects superior to chicle.

There are numerous species of the Euphorbia located in various parts of the world and supplying latex, which, according to my discovery, is suitable for chewing purposes. I have obtained excellent results with *Euphorbia tetracona*, *Euphorbia grandidens*, and *Euphorbia triangularis*, which are indigenous to South and South Central Africa, but my invention is in no way limited to these species. The latex of the Euphorbia species which I have examined usually has a distinct acrid burning taste, quickly noticeable in the mouth and throat, but is rendered substantially tasteless when the acrid agent is removed.

One method of debitterizing the Euphorbia coagulum is to treat it with alcohol, but my preferred method is with an alkali such as sodium hydroxide. This treatment can be made before or after coagulation, the former being preferred. Treatment for 72 hours with 25% caustic soda solution is effective. The gum is coagulated by heat or other means, and then manufactured into chewing gum, either by itself or preferably in combination with other ingredients and the usual flavoring materials.

The following are examples of preferred chewing gum compositions employing Euphorbia coagulum as the principal ingredient. The proportions given are percentage by weight, and the recipes are those of base compositions to which the usual flavoring and sweetening materials are added to produce finished chewing gum.

*Example 1*

|  | Per cent |
|---|---|
| Euphorbia coagulum | 74 |
| Pontianak (Jelutong) | 18.5 |
| Pale crepe rubber | 7.5 |

*Example 2*

|  | Per cent |
|---|---|
| Euphorbia coagulum | 70 |
| Pontianak (Jelutong) | 20 |
| Gutta soh | 10 |

*Example 3*

|  | Per cent |
|---|---|
| Euphorbia coagulum | 60 |
| Pontianak (Jelutong) | 30 |
| Gutta soh | 10 |

*Example 4*

|  | Per cent |
|---|---|
| Euphorbia coagulum | 63 |
| Pontianak (Jelutong) | 18 |
| Chicle | 10 |
| Gutta soh | 9 |

*Example 5*

|  | Per cent |
|---|---|
| Euphorbia coagulum | 64.5 |
| Pale crepe rubber | 4.0 |
| Gutta kay | 27.5 |
| Gutta soh | 4.0 |

It is evident that Example 1 above is made without using any of the varieties of gutta percha; Examples 1, 2, 3 and 5 are made without chicle; and Example 5 is made without pontianak. This indicates how universal is the application of Euphorbia coagulum as an ingredient in chewing gum base.

An important advantage of Euphorbia coagulum is that it is relatively clean in its natural state. Other gums, such as chicle, pontianak, and gutta kay contain substantial quantities of foreign matter which must be removed before manufacturing into chewing gum, entailing an expense which is eliminated when Euphorbia coagulum is used. Euphorbia coagulum also has a very smooth texture which is particularly desirable in a chewing gum, and in this respect is comparable with chicle and superior to pontianak.

Another desirable property of Euphorbia coagulum is that it does not oxidize readily. This characteristic is especially desirable in a chewing gum after being put on sale, as the oxidized material becomes brittle and practically worthless. Pontianak oxidizes so rapidly when comparatively dry that it is usually shipped containing 30% or more of moisture. Euphorbia coagulum can be dried down to 1% of moisture, and after storing for many months can be used in the manufacture of chewing gum base with perfect success.

I have subjected various chewing gums to an oxidation test in the Bierer-Davis bomb at an oxygen pressure of 300 lbs. to the square inch at a temperature of 70° C. I find that chewing gum containing a large proportion of Euphorbia coagulum is affected less by this treatment than gums containing the usual materials.

The methods of treatment and the various compositions mentioned above are simply intended as illustrative, and are not to be taken as limiting the invention, the scope of which is defined by the appended claims.

The invention claimed is:

1. A chewing gum comprising Euphorbia coagulum.

2. A chewing gum comprising debitterized Euphorbia coagulum.

3. A chewing gum base containing Euphorbia coagulum and other palatable ingredients in which the Euphorbia coagulum is present in preponderating amount.

4. A chewing gum comprising coagulum of the *Euphorbia tetracona*.

5. A chewing gum comprising coagulum of the *Euphorbia grandidens*.

6. A chewing gum comprising coagulum of the *Euphorbia triangularis*.

7. A chewing gum comprising Euphorbia coagulum, pontianak and rubber.

8. A chewing gum comprising Euphorbia coagulum, pontianak and gutta soh.

9. A chewing gum comprising Euphorbia coagulum, pontianak, gutta soh and chicle.

10. A chewing gum comprising Euphorbia coagulum, rubber, gutta kay and gutta soh.

11. The process of manufacturing chewing gum which comprises removing the bitter taste from Euphorbia coagulum, and mixing the debitterized gum with other palatable ingredients.

Signed at New York, in the county of New York and State of New York, this 14th day of February, A. D. 1930.

VAN LEAR WOODWARD.